(12) United States Patent
Kukacka et al.

(10) Patent No.: US 9,165,577 B2
(45) Date of Patent: Oct. 20, 2015

(54) SPINSTAND WITH MOTOR HAVING FLUID DYNAMIC BEARING

(71) Applicant: Seagate Technology LLC, Cupertino, CA (US)

(72) Inventors: Dale E. Kukacka, New Prague, MN (US); David G. Wobbe, Wabasha, MN (US); Timothy Edward Langlais, Minneapolis, MN (US); ReAnn Dargus Robelia, Richfield, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/198,501

(22) Filed: Mar. 5, 2014

(65) Prior Publication Data

US 2014/0254342 A1 Sep. 11, 2014

Related U.S. Application Data

(60) Provisional application No. 61/773,809, filed on Mar. 6, 2013.

(51) Int. Cl.
*G11B 5/48* (2006.01)
*G11B 5/455* (2006.01)

(52) U.S. Cl.
CPC ............ *G11B 5/4555* (2013.01); *G11B 5/4873* (2013.01)

(58) Field of Classification Search
CPC .......... G11B 5/82; G11B 5/48; G11B 5/4873; G11B 5/455; G11B 5/4555
USPC ............................................... 360/254–254.9
See application file for complete search history.

(56) References Cited

U.S. PATENT DOCUMENTS

| | | | |
|---|---|---|---|
| 6,229,303 B1 * | 5/2001 | Guzik | ............................ 324/212 |
| 6,346,809 B1 | 2/2002 | Karam et al. | |
| 7,768,740 B2 | 8/2010 | Pettman et al. | |
| 7,954,119 B2 | 5/2011 | Warn et al. | |
| 8,221,192 B2 | 7/2012 | Kashiwase et al. | |
| 8,456,976 B2 | 6/2013 | Granger-Brown et al. | |
| 8,611,048 B2 | 12/2013 | Brady et al. | |
| 2005/0219966 A1 | 10/2005 | Ishimoto et al. | |
| 2012/0200287 A1 | 8/2012 | Warn et al. | |

* cited by examiner

*Primary Examiner* — Allen T Cao

(57) ABSTRACT

Provided herein is an apparatus, including a spinstand configured to position a disk in a testing orientation and a motor coupled to the spinstand, configured to rotate the disk. The motor comprises a fluid dynamic bearing.

11 Claims, 7 Drawing Sheets

SPINSTAND WITH MOTOR HAVING FLUID DYNAMIC BEARING

This application claims the benefit of U.S. Provisional Patent Application No. 61/773,809, filed Mar. 6, 2013.

BACKGROUND

In order to test the reliability of a head-disk interface engineers employ spinstands that allow for component-level reliability testing. Spinstands employ a motor to spin the disk and an adjustable mount on which to affix the read-write head, suspension, or head stack assembly ("HSA"). Currently, spinstands use ball bearing-based motors to spin the disks, and the ball bearing-based motors are very expensive to replace. Ball bearing-based motors inherently have radial runout issues that lead to increasingly less accurate radial positioning of the head on the disk. Ball, race, and cage modes all significantly contribute to this radial runout. Furthermore, ball bearing-based motors employ oil and/or grease in the bearings that can outgas, which can contaminate the head-disk interface being tested. Moreover, seals on ball bearing-based motors can rub, creating particulate contamination in the process. Such particulate contamination may render the reliability test worthless because the reliability test is meant to stress the head-disk interface without the influence of external contamination.

SUMMARY

Provided herein is an apparatus, including a spinstand configured to position a disk in a testing orientation and a motor coupled to the spinstand, configured to rotate the disk. The motor comprises a fluid dynamic bearing.

These and other aspects and features of the invention may be better understood with reference to the following drawings, description, and appended claims.

DRAWINGS

Figure 1:
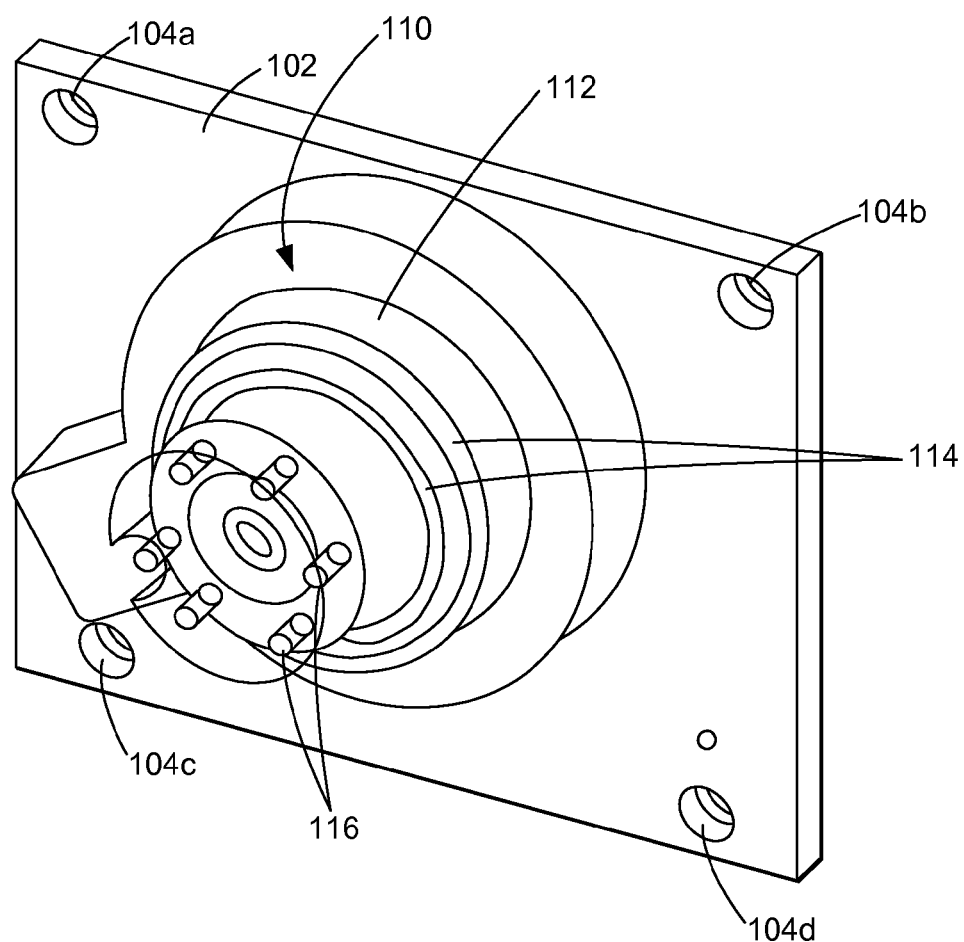

FIG. 1 provides a front view of an apparatus comprising a fluid dynamic bearing-based motor on a bracket according to one aspect of the embodiments.

Figure 2:
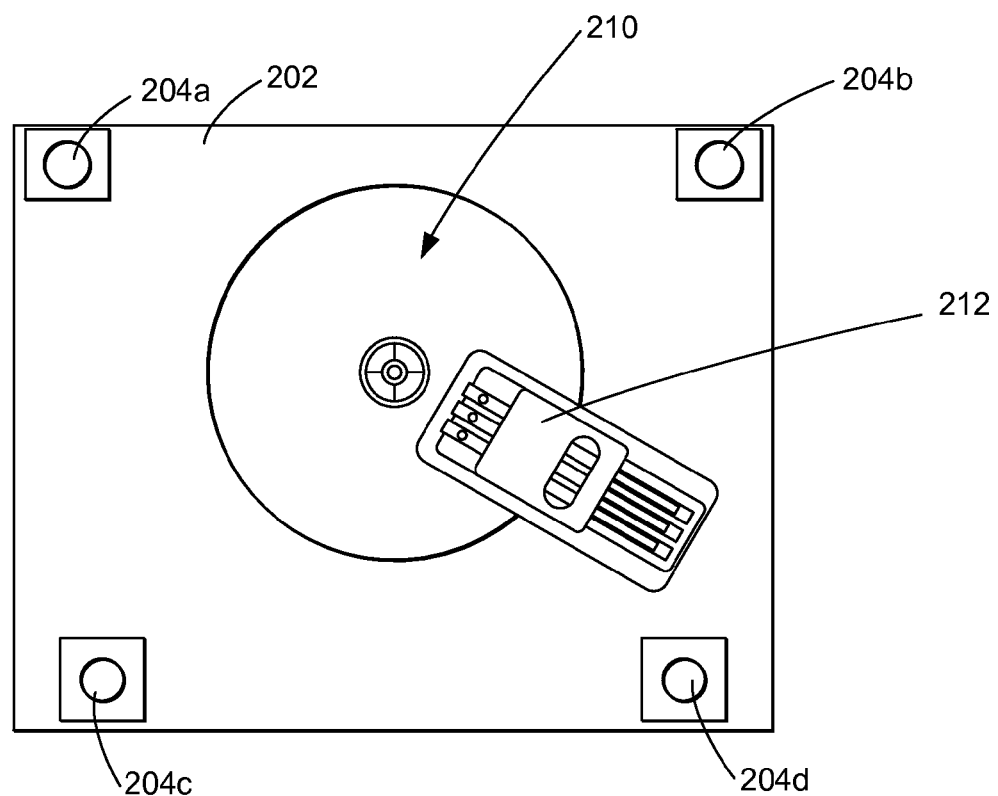

FIG. 2 provides a bottom view of an apparatus comprising a fluid dynamic bearing-based motor on a bracket according to one aspect of the embodiments.

Figure 3:
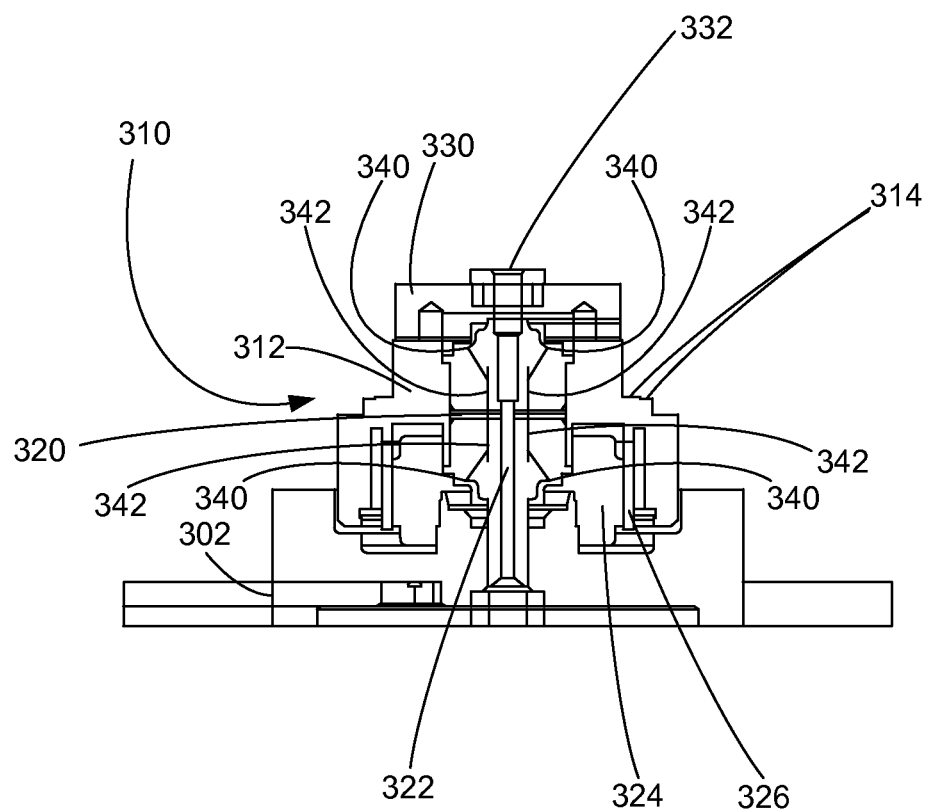

FIG. 3 provides a cross section of an apparatus comprising a fluid dynamic bearing-based motor on a bracket according to one aspect of the embodiments.

Figure 4A:
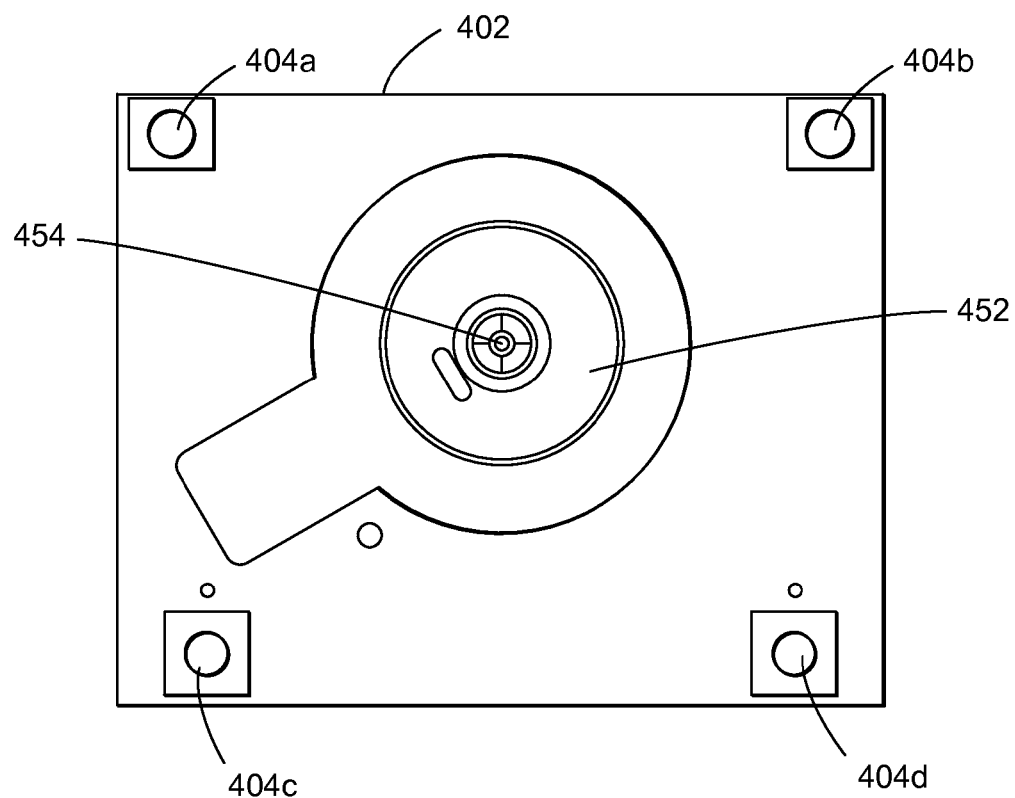
Figure 4B:
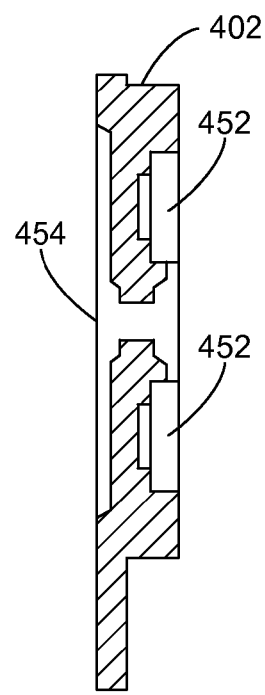

FIGS. 4A-B provide a top view and a side view of a motor bracket according to one aspect of the embodiments.

Figures 5A, 5B:
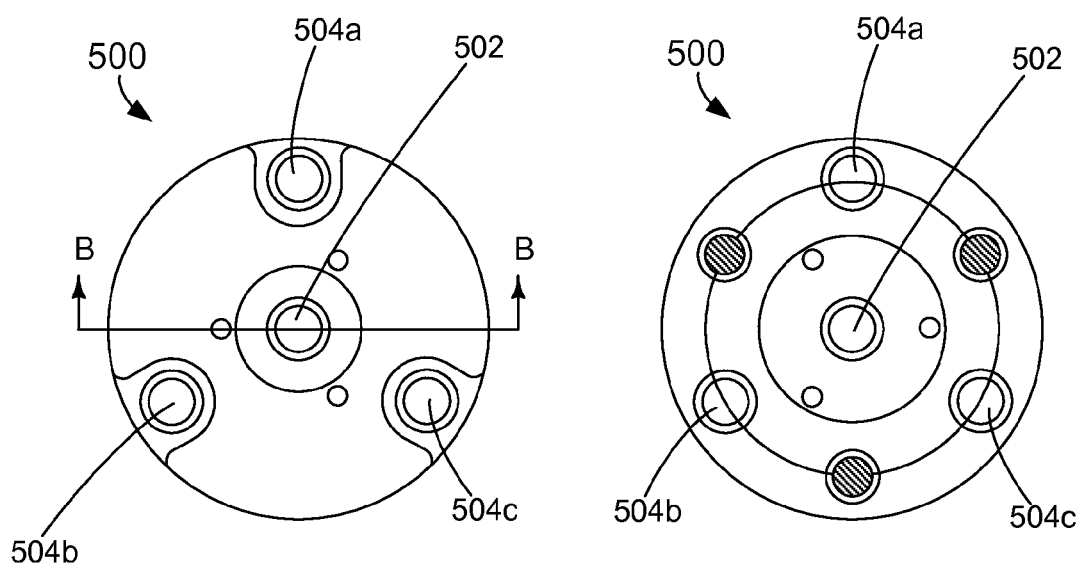
Figure 5C:
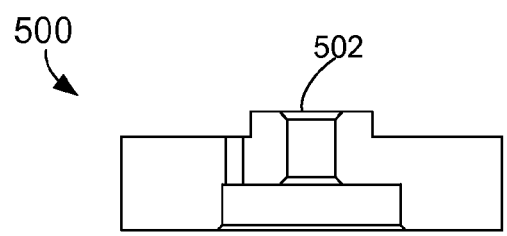

FIGS. 5A-C provide a top, a bottom, and a side view of a top cap of an apparatus comprising a fluid dynamic bearing-based motor on a bracket according to one aspect of the embodiments.

Figure 6:
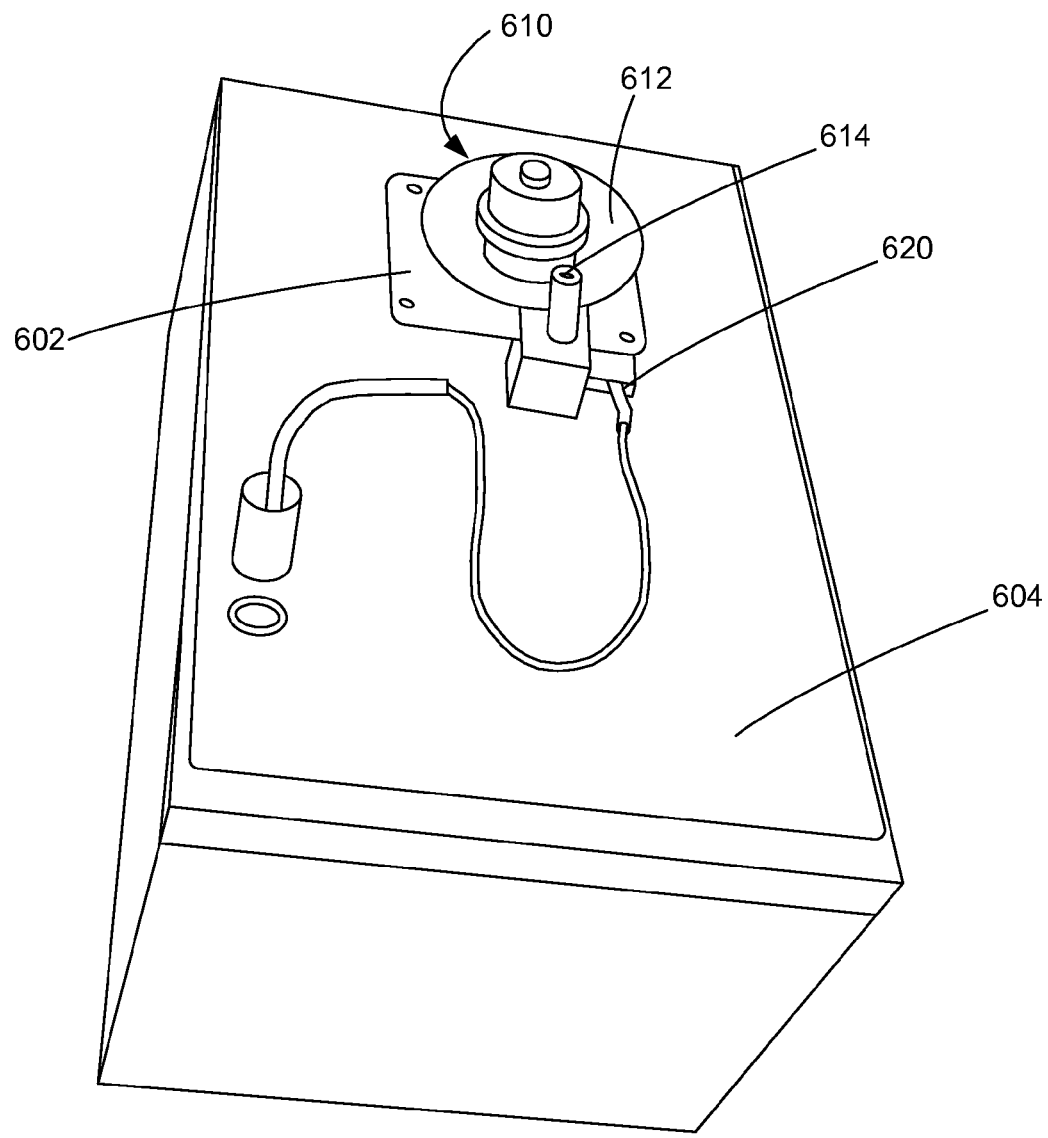

FIG. 6 provides a perspective view of an apparatus comprising a fluid dynamic bearing-based motor on a bracket mounted on a spinstand according to one aspect of the embodiments.

Figure 7:
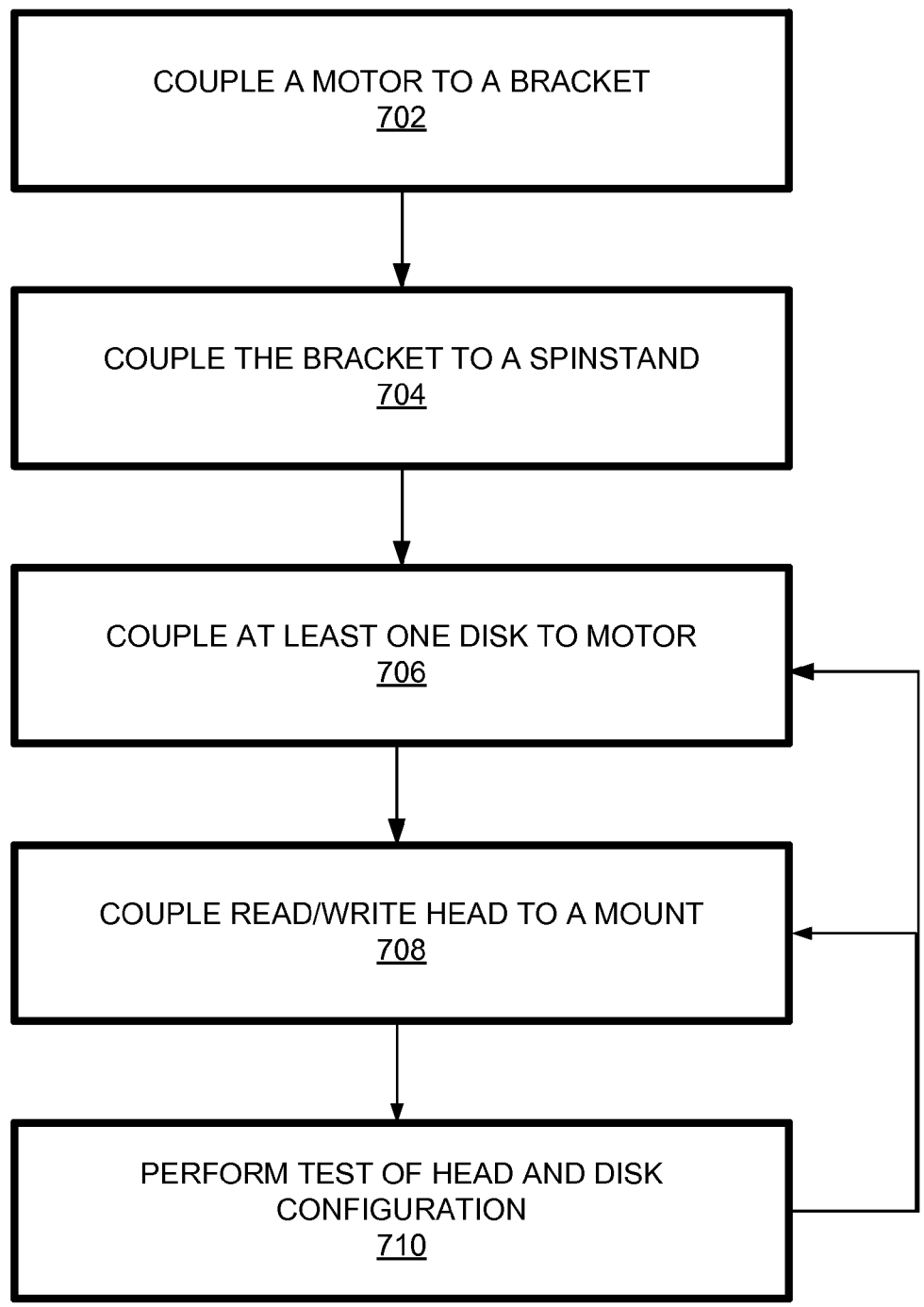

FIG. 7 provides a flow chart of a process for testing a head and disk configuration according to one aspect of the embodiments.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Spinstands for component-level reliability testing of head-disk interfaces employ ball bearing-based motors to spin the disks and the ball bearing-based motors are expensive to replace. The fluid dynamic bearing-based motors provided herein may replace the ball bearing-based motors currently used in spinstands, as fluid dynamic bearings have less radial runout, extendibility at higher temperatures, and are less prone to contamination than ball bearings. The fluid dynamic bearing-based motors are able to better maintain flatness (e.g., between a bottom portion of a head and a media during testing) than a ball bearing-based motor. Furthermore, fluid dynamic bearings have longer usage lives, improved performance, less motor noise, and/or lower cost when compared to ball bearing-based motors. Embodiments may be configured to enable testing of new designs of heads, media (e.g., disks), and combinations thereof. Embodiments thereby enable more efficient and reliable head testing and media testing.

FIG. 1 provides a front view of an apparatus comprising a fluid dynamic bearing-based motor on a bracket according to one aspect of the embodiments. FIG. 1 depicts a motor bracket assembly including bracket 102 and motor 110.

Bracket 102 is configured to support motor 110 (e.g., a fluid dynamic bearing (FDB) motor) and configured to couple a motor 110 to a spinstand (e.g., spinstand 604). Bracket 102 includes openings 104a-d. Openings 104a-d are configured for coupling (e.g., via fasteners, screws, etc.) bracket 102 to a spinstand (e.g., spinstand 604). In some embodiments, the spinstand is configured to position a disk in a testing orientation (e.g., for testing of a head and disk configuration). In some embodiments, motor 110 may be permanently affixed to bracket 102 or pre-assembled as a single piece or part.

Motor 110 includes hub 112 with disk mount structures or surfaces 114 and structures 116. Hub 112 is configured for coupling of one or more disks to motor 110. Hub 112 is further configured for rotating disks coupled to motor 110. In some embodiments, hub 112 includes disk mount surfaces 114 configured for coupling one or more disks of different thicknesses and different diameters. In other words, hub 112 is configured for testing media of different thicknesses and different diameters via disk mount surfaces 114. In some embodiments, disk mount surfaces 114 are configured as mounting points on hub 112 for at least one disk. Structures 116 are configured for coupling of a top cap (e.g., top cap 330) and balancing rotation of hub 112.

FIG. 2 provides a bottom view of an apparatus comprising a fluid dynamic bearing-based motor on a bracket according to one aspect of the embodiments. FIG. 2 depicts a bottom view of a bracket 202. Bracket 202 is configured to support motor 210 and configured to couple motor 210 to a spinstand (e.g., spinstand 604 via openings 204a-d and fasteners). Bracket 202 may include control electronics 212 coupled to motor 210 using interconnects that may include pins, cables, or wires (not shown).

FIG. 3 provides a cross section of an apparatus comprising a fluid dynamic bearing-based motor on a bracket according to one aspect of the embodiments. FIG. 3 depicts a side view of a bracket motor assembly 300 configured for testing one or more disk and head combinations.

Bracket motor assembly 300 includes bracket 302 and motor 310. Bracket 302 is coupled to motor 310. Bracket 302 is configured to support motor 310 and configured to couple motor 310 to a spinstand (e.g., spinstand 604). Motor 310 includes hub 312, disk mount surfaces 314 (e.g., for mounting at least one disk on hub 312), top cap 330, stator assembly 324 (e.g., yoke, stator teeth, and field coils), magnet 326, shaft 322 and sleeve assembly 320. Stator assembly 324 is configured to cause hub 312 and components coupled thereto to rotate. In some embodiments, stator assembly 324 may be coupled to bracket 302. In some embodiments, magnet 326 is coupled to the hub (with a backiron therebetween). Top cap 330 is configured for mounting a clamp for clamping the at least one disk on the mounting point for the at least one disk. In some embodiments, top cap 330 is coupled to hub 312 via fastener 332 (e.g., a screw, etc.). Various motor components may define one or more fluid dynamic bearings. For example, sleeve assembly 320 and shaft 322 may define at least one fluid dynamic bearing. Motor 310 includes thrust bearings 340 and journal bearings 342.

In some embodiments, a fluid dynamic bearing may be utilized in a motor (e.g., spindle motor) to provide stiffness to the motor such that unwanted radial and/or angular motion in the motor and/or between components thereof are minimized. Such a fluid dynamic bearing may use a fluid medium between two bearing surfaces to provide the stiffness to the motor and/or between the components thereof. In some embodiments, a grooved bearing surface of a fluid dynamic bearing pumps the fluid medium in response to relative rotational motion between the two bearing surfaces and, consequently, pressurizes the fluid dynamic bearing providing stiffness to the motor and/or between the components thereof.

With respect to the at least one fluid dynamic bearing, such a fluid dynamic bearing may comprise a journal bearing, a thrust bearing, or a conical bearing. The shaft and sleeve assembly may comprise a plurality of fluid dynamic bearings such as two, three, four, five, six, or more fluid dynamic bearings. A plurality of fluid dynamic bearings may include any combination of journal bearings, thrust bearings, and conical bearings, such as at least one journal bearing and at least one thrust bearing, for example, or one journal bearing and two thrust bearings. The fluid dynamic bearings may be grooved or ungrooved.

FIGS. 4A-B provide a top view and a side view of a motor bracket according to one aspect of the embodiments. FIGS. 4A-B depict a bracket 402 prior to coupling of a motor (e.g., motor 110). Bracket 402 includes openings 404a-d, motor opening 452, and motor coupling opening 454. Openings 404a-d are configured for coupling (e.g., via fasteners, screws, etc.) of bracket 402 to a spinstand (e.g., spinstand 604). Motor opening 452 is configured for supporting and enclosing a bottom portion of a motor (e.g., an FDB motor). Motor coupling opening 454 is configured for coupling a motor (e.g., electrically, communicatively, etc.) to a spinstand (e.g., spinstand 604).

FIGS. 5A-C provide a top, a bottom, and a side view of a top cap of an apparatus comprising a fluid dynamic bearing-based motor on a bracket according to one aspect of the embodiments. Top cap 500 may be configured for mounting a clamp (not shown) for clamping at least one disk on a mounting point (e.g., one of disk mount surfaces 114) on a hub (e.g., hub 112) for the at least one disk. Top cap 500 may thus apply pressure and contact (e.g., clamping) to a clamp (not shown) for holding media (e.g., disks) in place. Opening 502 is configured for coupling top cap 500 to a motor (e.g., motor 110) via a fastener (e.g., screw, etc.). Opening 502 through the top cap may be used with fasteners to couple top cap 500 to a hub (e.g., hub 112) and to clamp the at least one disk on the mounting point on the hub (e.g., hub 112) for the at least one disk. Openings 504a-c are configured for balancing a hub (e.g., hub 112) and disk assembly. In some embodiments, openings 504a-c are configured for centering or balancing a load onto a motor (e.g., motor 110). A cross section (e.g., Section B-B) of the top cap is provided in FIG. 5C.

FIG. 6 provides a perspective view of an apparatus comprising a fluid dynamic bearing-based motor on a bracket mounted on a spinstand according to one aspect of the embodiments. FIG. 6 depicts an apparatus 600 including a hard drive assembly (HSA) mounted on spinstand 604. The hard drive assembly may include motor 610 and disk 612.

Apparatus 600 supports various different disks (e.g., disk 612) being mounted on motor 610 and various read/write heads being mounted on read/write head mount 614. In some embodiments, motor 610 may be software controlled or may be controlled externally.

Apparatus 600 includes a spinstand 604 for testing the reliability of a head-disk interface, an adjustable mount 614 coupled to the spinstand configured to mount a read-write head, a suspension and the read-write head, or a head stack assembly comprising the suspension and the read-write head, bracket 602 configured to support motor 610 and to couple motor 610 to spinstand 604, at least one disk 612 mounted on a mounting point (i.e., disk mount surfaces 114) of a hub (e.g., hub 112) for at least one disk, and a top cap (e.g., top cap 330) configured for mounting a clamp for clamping the at least one disk on the mounting point of the hub for the at least one disk. In some embodiments, spinstand 604 is configured to position a disk in a testing orientation (e.g., for testing of a head and disk configuration). The top cap may be used to test head-disk interfaces for hard disk drives at the component level.

Spinstand 604 may include a variety of components inside, including but not limited to, wiring, strain gauges, strain arms, friction measuring devices, acoustic measurement devices (e.g., including vibration), laser capacitance, and other diagnostic and measurement devices. The components inside of spinstand 604 may be configured for capturing measurements and data for evaluating media and head performance. Acoustical emission device 620 is configured for capturing acoustical emissions. In some embodiments, the acoustical emissions device is used in reading of feedback from the head.

Embodiments thereby enable testing of a plurality of different media for a particular head and testing a plurality of different heads for a particular media and combinations thereof. Embodiments are configured to test mechanical response including friction, acoustic emissions, and dual ended thermal coefficient of resistance (DETCR) (e.g., concurrently) and mechanical response during sweeping movement tests. The testing of the mechanical response may be part of a critical-to-quality (CTQ) tree for customer qualification. In some embodiments, improved clamping distortion is provided is configured to help in maintaining constant clearance while the head sweeps over the media (e.g., a disk). Embodiments are further configured for testing of various head and lubricant configurations (e.g., or head and lubricant combinations) for responses to temperature, humidity, and altitude. Embodiments may further allow testing of reading, writing, and head touch down events.

FIG. 7 provides a flow chart of a process for testing a head and disk configuration according to one aspect of the embodiments. FIG. 7 depicts a process for testing a read/write head with a disk with a motor comprising at least one fluid dynamic bearing.

At block 702, a motor is coupled to a bracket. As described herein, the bracket may be configured to support the motor (e.g., an FDB motor) and configured to couple motor 110 to a spinstand (e.g., spinstand 604). In some embodiments, block 702 may be optional as the motor and bracket may be pre-assembled as one piece.

At block 704, the bracket is coupled to a spinstand. The bracket may include connections for controlling the motor via an interface of the spinstand.

At block 706, at least one disk is coupled to the motor. As described herein, the at least one disk may be coupled to a hub of the motor and may be part of a disk and head configuration to be tested.

At block 708, a read/write head is coupled to a mount. In some embodiments, the mount is an adjustable mount configured for coupling of a read-write head, a suspension, or a head stack assembly ("HSA").

At block 710, a test of the head and disk configuration is performed. The spinstand may include one or more diagnostic devices configured for capturing measurements of the performance of the head and disk configuration. Block 706 or block 708 may then be repeated to test another head and disk configuration.

Provided herein is an apparatus, a spinstand configured to mount a disk in a testing position and a motor, coupled to the spinstand, configured to rotate the disk. The motor comprises a fluid dynamic bearing. The apparatus further includes an adjustable mount coupled to the spinstand configured for mounting of a read-write head. In some embodiments, the fluid dynamic bearing comprises a journal bearing. In some embodiments, the fluid dynamic bearing comprises a thrust bearing. In some embodiments, the motor comprises a plurality of fluid dynamic bearings. The motor may include a plurality of disks. In some embodiments, the disk is mounted on a hub of the motor. In some embodiments, the apparatus further includes a bracket configured to support the motor and configured to couple the motor to the spinstand. In some embodiments, the adjustable mount is further configured for mounting a suspension for the read-write head. In some embodiments, the adjustable mount is further configured for mounting a head stack assembly comprising the suspension and the read-write head. In some embodiments, the apparatus is configured to test head-disk interfaces for hard disk drives at the component level.

Also provided herein is an apparatus, including a spinstand configured to position a disk in a testing orientation and a motor, coupled to the spinstand, configured to rotate the disk. The motor comprises a fluid dynamic bearing. In some embodiments, the apparatus further includes an adjustable mount coupled to the spinstand configured for mounting of a read-write head. In some embodiments, the adjustable mount is configured for mounting a head stack assembly comprising a suspension and the read-write head. In some embodiments, the motor is configured for testing head-disk interfaces for hard disk drives at the component level.

Also provided is an apparatus, including a motor comprising at least one fluid dynamic bearing and a hub rotatably attached to the motor. The hub is configured for mounting at least one disk. The apparatus includes a bracket configured to support the motor and configured to couple the motor to a spinstand for testing head-disk interfaces for hard disk drives at the component level. In some embodiments, the at least one fluid dynamic bearing comprises a journal bearing. In some embodiments, the at least one fluid dynamic bearing comprises a thrust bearing. In some embodiments, the motor comprises a plurality of fluid dynamic bearings. In some embodiments, the motor comprises at least one journal bearing and at least one thrust bearing. In some embodiments, the apparatus further comprises a top cap configured for mounting a clamp for clamping the at least one disk to the hub.

In some embodiments, the apparatus is configured for testing a mechanical response of a head-disk configuration. In some embodiments, the apparatus is configured for measuring friction of a head-disk configuration. In some embodiments, the apparatus is configured for measuring acoustical emissions of a head-disk configuration. In some embodiments, the apparatus is configured for measuring the dual ended thermal coefficient of resistance (DETCR) of a head-disk configuration. In some embodiments, the apparatus is configured for measuring performance of a head-disk configuration during a sweeping motion of the head. In some embodiments, the apparatus is configured for measuring a head and lubricant response to changes in factors selected from the group consisting of temperature, humidity, and altitude.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
a spinstand configured to mount a disk in a testing position;
a motor, coupled to the spinstand, configured to rotate the disk, wherein the motor comprises a fluid dynamic bearing; and an adjustable mount coupled to the spinstand configured for mounting of a read-write head, wherein the adjustable mount is further configured for mounting a suspension for the read-write head.

2. The apparatus of claim 1, wherein the fluid dynamic bearing comprises a journal bearing.

3. The apparatus of claim 1, wherein the fluid dynamic bearing comprises a thrust bearing.

4. The apparatus of claim 1, wherein the motor comprises a plurality of fluid dynamic bearings.

5. The apparatus of claim 1, wherein the motor comprises a plurality of disks.

6. The apparatus of claim 1, wherein the disk is mounted on a hub of the motor.

7. The apparatus of claim 1, further comprising a bracket configured to support the motor and configured to couple the motor to the spinstand.

8. The apparatus of claim 1, wherein the adjustable mount is further configured for mounting a head stack assembly.

9. The apparatus of claim 1, wherein the apparatus is configured to test head-disk interfaces.

10. An apparatus, comprising:
   a spinstand configured to position a disk in a testing orientation;
   a motor, coupled to the spinstand, configured to rotate the disk, wherein the motor comprises a fluid dynamic bearing;
   an adjustable mount coupled to the spinstand configured for mounting of a read-write head, wherein the adjustable mount is configured for mounting a head stack assembly comprising a suspension and the read-write head.

11. The apparatus of claim 10, wherein the motor is configured for testing head-disk interfaces for hard disk drives at the component level.

* * * * *